(No Model.)
2 Sheets—Sheet 1.
G. T. CARTER.
MACHINERY FOR FELTING HAT BODIES.
No. 248,402. Patented Oct. 18, 1881.
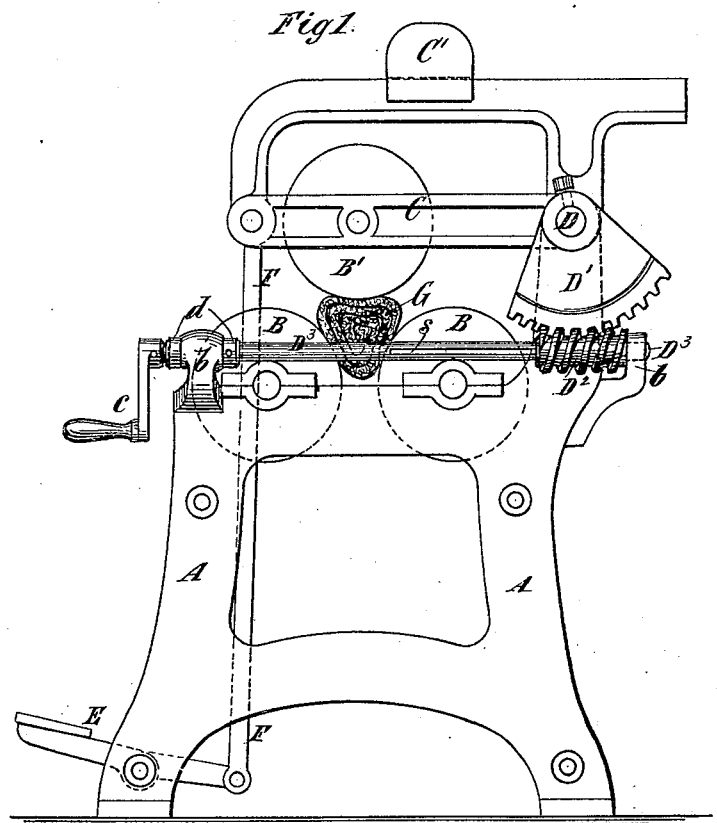
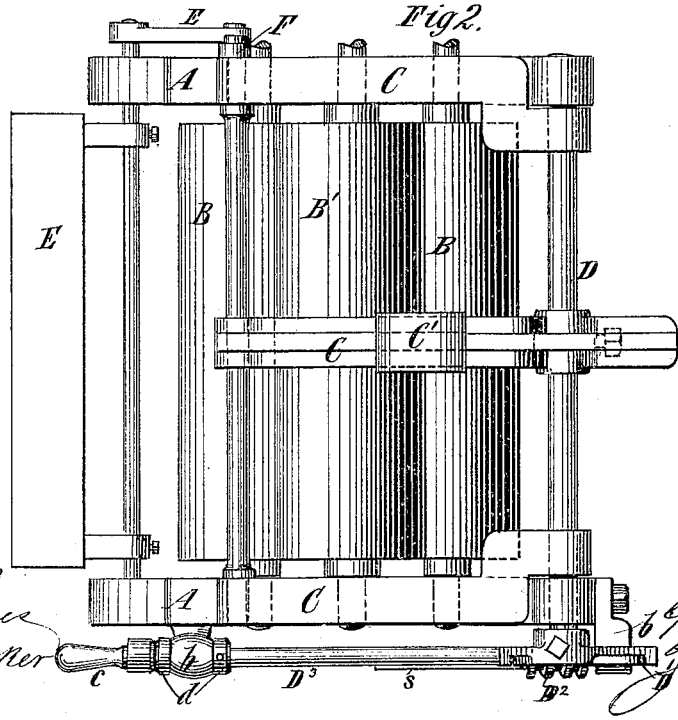
Witnesses
Inventor (No Model.) 2 Sheets—Sheet 2.

G. T. CARTER.
MACHINERY FOR FELTING HAT BODIES.

No. 248,402. Patented Oct. 18, 1881.

UNITED STATES PATENT OFFICE.

GEORGE T. CARTER, OF ELIZABETH, NEW JERSEY, ASSIGNOR TO JOHN T. WARING, OF NEW YORK, N. Y.

MACHINERY FOR FELTING HAT-BODIES.

SPECIFICATION forming part of Letters Patent No. 248,402, dated October 18, 1881.

Application filed June 16, 1881. (No model.)

*To all whom it may concern:*

Be it known that I, GEORGE T. CARTER, of the city of Elizabeth, in the county of Union and State of New Jersey, have invented a new and useful Improvement in Machinery for Felting Hat-Bodies and other Articles, of which the following is a specification, reference being had to the accompanying drawings.

This invention relates to that class of felting-machines in which the felting is performed between three or four rollers, two of which work in fixed bearings in a stationary frame, and the other or others of which work in bearings in a frame, which is pivoted or fulcrumed by a shaft or journals, so as to be capable of rising and falling above the said stationary frame.

My improvement consists in the combination, with such rising and falling frame and a roller or rollers therein, of a shaft or journal upon which said frame is fulcrumed, and which is adapted to rock as said frame rises and falls, and mechanism connected directly to said shaft or journal, and adapted to be adjusted to limit the downward or falling movement of the frame, and thus regulate the size to which a roll of hat-bodies or analogous articles may be reduced by felting. The said mechanism may consist of a toothed sector fixed upon the shaft or one of the journals of said rising and falling frame, and a worm or screw upon a shaft or spindle, which may be turned by hand; and in order to permit the rising and falling frame to be raised by a treadle in the usual way, to provide for introducing a roll of hat-bodies or other articles between the rollers, I connect said worm or screw with its shaft or spindle by means of a spline or feather, so that it may move longitudinally as the frame is raised by the treadle.

The improvement also consists in a spring so applied to or in connection with the said rising and falling frame as to be capable of increasing the pressure produced by the upper roller or rollers upon the roll of hat-bodies or other articles to be felted in and by the machine, or of partly balancing the said frame and rollers, so as to diminish the pressure; also, in means of adjusting the said spring for the purpose of varying its pressing or pressure-relieving effect upon the said rollers.

Figure 3:
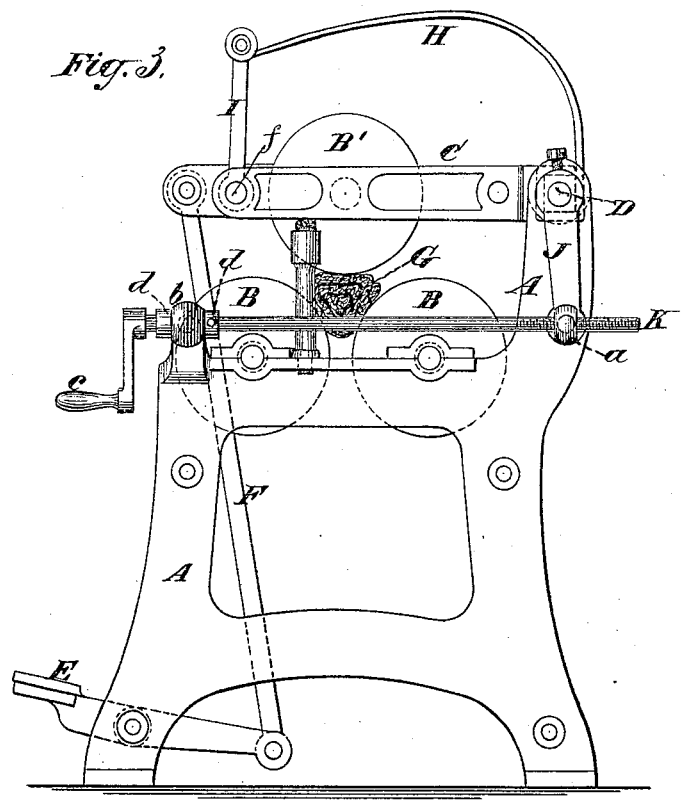
Figure 4:
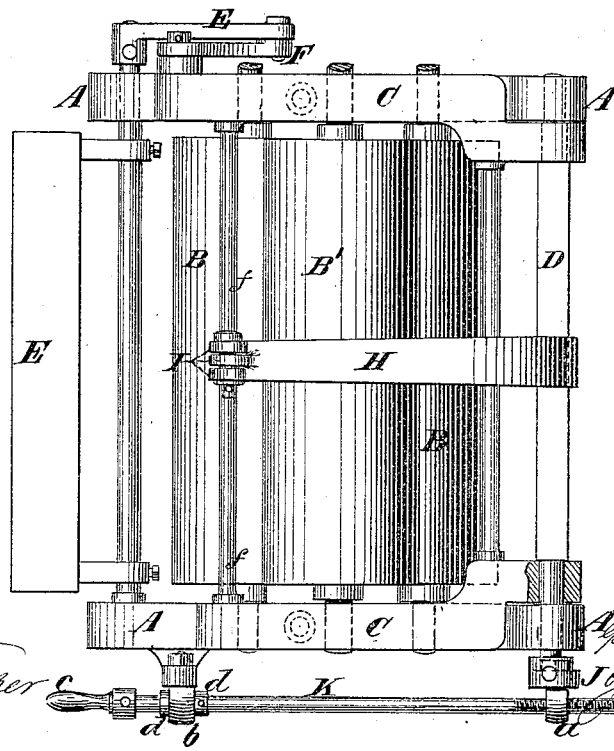

Figure 1 in the drawings is a side elevation of the principal parts of a machine with my invention applied. Fig. 2 is a top view of the same; and Figs. 3 and 4 are similar views of a machine of slightly-modified form, embodying a spring for use as above described.

Referring first to Figs. 1 and 2, A is the stationary main frame of the machine.

B B are the two lower rollers, the axles or journals of which work in stationary bearings in the said frame A.

C is the upper rising and falling frame, pivoted to the rear of the main frame A by a horizontal shaft, D, which is fitted to turn in bearings in the main frame, and also fitted to the upper frame, C, in such manner that the latter will turn or rock therewith.

B' designates an upper roller, which is fitted to bearings provided for it in the frame C.

E is the treadle, and F the rod connecting it with the front of the frame C, for the purpose of raising the front part of the said frame and its roller B' high enough to permit the insertion of the roll G of hat-bodies or other articles to be felted.

The machine thus far described is a well-known kind of "three-roller" felting-machine. The means of gearing or belting the several rollers together and of driving them are not represented, as they form no part of my invention, and it will be sufficient to mention that they may be such as are commonly used.

C' designates a weight which is applied to the top of the frame C, and which may be adjusted along the frame toward and from the shaft D, to diminish or increase the downward pressure of said frame upon the roll G.

Upon the end of the shaft D, outside the side frame of the machine, is fixed securely a toothed sector, D'; and $D^2$ designates a worm or screw, which engages with the teeth thereof, and the rotation of which will serve to oscillate the sector and the shaft D. The worm or screw $D^2$ is fitted upon a shaft or spindle, $D^3$, which is provided with a longitudinal feather, *s*, which fits in a groove in the worm or screw, thus affording provision for the longitudinal movement of the worm or screw upon its shaft when the frame C is raised by the treadle E and the sector D' is oscillated with its shaft D. The shaft or spindle $D^3$ is mounted in bearings *b*, wherein it may be turned by a crank-handle, $c$, or a hand-wheel, which is at the front of the machine, where it may be readily reached and operated with one hand by the attendant. Upon the shaft or spindle $D^3$ are collars $d$, which bear against the opposite sides of one of the bearings $b$ and prevent longitudinal movement of the shaft or spindle in either direction. The sector $D'$ may very properly be considered a lever for turning the shaft D.

By turning the shaft or spindle $D^3$, it will be seen that the extent of the downward movement of the frame C may be varied, and the roller $B'$ may be permitted to approach more or less closely to the rollers B, thus regulating the size to which the roll G of hat-bodies or other articles may be reduced. It will also be seen that I do not at all interfere with the raising of the frame C by the treadle, because the worm or screw $D^2$ can slide freely longitudinally on the shaft or spindle $D^3$.

Referring, now, to Figs. 3 and 4, it will be seen that the arrangement of the lower and upper frames, A C, their rollers B B B', the treadle E, and rod F is the same as in Figs. 1 and 2, except that the rock-shaft D, which forms a fulcrum for the rising and falling frame C, is free to turn independently of said frame, for a purpose hereinafter described.

H designates a spring, which is secured firmly to the shaft D, which is made of square form between its pivots or journals, to provide for securing the spring H to it by making the latter with a square eye, to fit the square part of said shaft. The front end of this spring is connected by a short rod or link, I, with the cross-bar $f$ of the upper frame, C. On the right-hand end of the shaft D, which projects outside of the main frame, there is firmly secured an arm or lever, J, in which is fitted a swiveling nut, $a$, which receives a screw-thread on a shaft, spindle, or rod, K, which is also fitted to turn in a swiveling bearing, $b$, secured in the adjacent side of the main framing. The said nut may be considered as a part of the lever J. This rod K is furnished with a hand-crank, $c$, at its front end, and it has fast upon it two collars, $d\ d$, one in front of and one behind the bearing $b$, to prevent the said rod from moving lengthwise, and to cause its screw-thread working in the nut $a$ to push back or pull forward the arm J, according to the direction in which the said rod is turned by the crank $c$, and thereby to turn the shaft D one way or the other, and so to make the spring exert more or less downward pressure or lift upon the frame C and upper roller, according to the kind of work to be performed by the machine and the pressure required to be exerted by the said roller to do such work to the best advantage.

It will be understood that by means of the screw-rod K the spring may be so adjusted that it will be almost inert upon the upper frame, C, and top roller, B', and then the said roller will operate with a pressure very little varying from what is due to its own weight and that of the said frame and their appurtenances; or the said spring may be so adjusted as either to take off or increase this pressure. When the spring is adjusted so as to partly balance the weight of the frame C and appurtenances, said frame will fall until the tension of the spring is increased to such a degree as to balance the weight, when the downward movement of said frame will cease. Hence it will be seen that by adjusting the screw spindle or rod K the extent of downward movement of the frame C may be varied and the size of the roll G regulated. This spring will also cause the upper roller to exert a more lively pressure, which yields more readily to inequalities in the work than a pressure produced by mere weight.

In lieu of the arm or lever J and screw-rod K for turning the shaft D, the toothed sector $D'$ and worm or screw $D^2$ might be used; but in such case said worm or screw need not be adjustable longitudinally on its shaft $D^3$.

It is obvious that the spring H and the means of adjusting it, as described, are just as well applicable to a "four-roller" felting-machine—that is to say, to one having two rollers in the upper frame, C—as to the three-roller machine described.

It is also obvious that it can be applied to all felting-machines of these classes, whatever the form of the rollers used, whether cylindrical, as herein represented, or of any other form or forms—such, for instance, as the rollers with the various kinds of concave profile and lagged periphery shown in the reissued patent of John T. Waring, No. 9,683, dated April 26, 1881.

I do not confine myself to the use of a spring of the kind herein represented and described for the purpose of varying the pressure of the upper roller or rollers, as the necessary elastic or yielding pressure may be applied by springs of other kinds—as, for instance, the shaft D may be constructed to work as a torsion-spring, or the frame C itself may be made sufficiently elastic.

What I claim as my invention, and desire to secure by Letters Patent, is—

1. The combination, with the upper rising and falling frame and a roller or rollers carried therein, of a shaft or journal by which said frame is fulcrumed, and which is adapted to turn or rock as said frame rises and falls, and mechanism connected directly with said shaft or journal, and adapted to turn the same to limit the downward movement of said frame, substantially as specified.

2. The combination, with the upper rising and falling frame and a roller or rollers carried thereby, of a lever fixed to said shaft and a worm or screw engaging with said lever for actuating it, substantially as specified.

3. The combination, with the frame C, carrying a roller or rollers, and the shaft D, to which said frame is fixed, of the toothed sector $D'$, the adjusting shaft or spindle D³, and the worm or screw D², movable longitudinally on said shaft or spindle, substantially as specified.

4. The combination, in a felting-machine, with an upper rising and falling frame and a roller or rollers contained therein, of a spring applied to the said frame for the purpose of increasing the pressure of said roller or rollers, or partly balancing said frame, so as to diminish the pressure of said roller or rollers, substantially as herein described.

5. The combination, in a felting-machine, with an upper rising and falling frame and a roller or rollers contained therein, of a spring applied to said frame for the purpose of increasing the pressure of said roller or rollers, or for partly balancing said frame, and means for regulating the effect of said spring, substantially as herein described.

6. The combination, with the main frame A and upper roller-frame, C, of the shaft D, spring H, arm J, nut $a$, screw-rod K, and bearing $b$, substantially as and for the purpose herein described.

GEORGE T. CARTER.

Witnesses:
M. H. KING,
MANNING F. TOWLEN.